Feb. 7, 1950            A. G. PERKINS            2,496,307
MILK FLOW CONTROL FOR MILKING MACHINES
Filed June 23, 1944            2 Sheets-Sheet 1
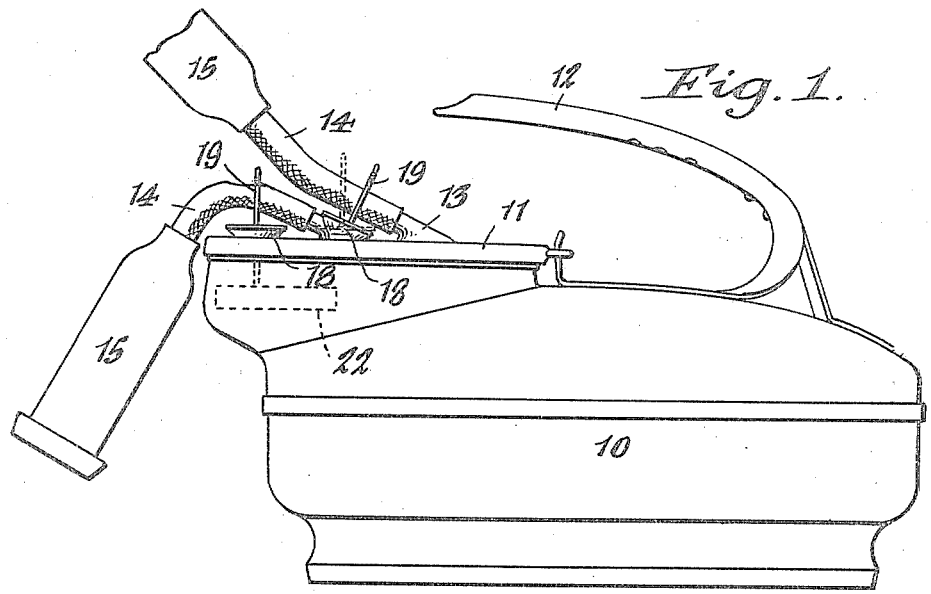
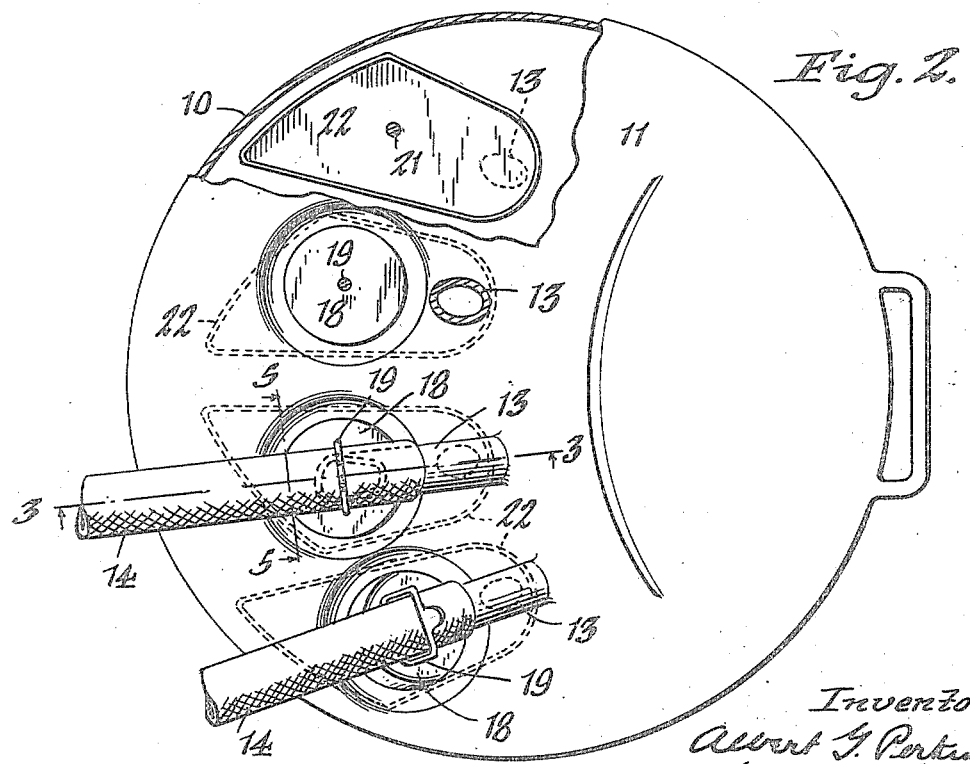

Feb. 7, 1950     A. G. PERKINS     2,496,307
MILK FLOW CONTROL FOR MILKING MACHINES
Filed June 23, 1944     2 Sheets—Sheet 2

Inventor,
Albert G. Perkins,
by Walter P. Geyer
Attorney.

Patented Feb. 7, 1950

2,496,307

UNITED STATES PATENT OFFICE 2,496,307

MILK FLOW CONTROL FOR MILKING MACHINES

Albert G. Perkins, Warsaw, N. Y.

Application June 23, 1944, Serial No. 541,680

23 Claims. (Cl. 31—86)

This invention relates generally to improvements in milking machines but more particularly to means for automatically releasing the teat cups of the machine from the cow as the flow of the milk ceases or is reduced to a predetermined minimum.

One of its objects is to provide an automatic means of this character which is so designed as to cause the individual teat cups on each quarter of the cow's bag to be automatically released or disconnected as each quarter is milked out or when the flow of milk therefrom reaches a point which is considered injurious to the cow.

Another object is to provide an attachment for milking machines for individually releasing the teat cups from the cow at predetermined times in the milking operation by flow-control means rendered operative by a reduction in the normal flow of milk extracted from each quarter of the cow's bag to selectively break the vacuum in the connections between the milking machine and the teats of the cow.

Other features of the invention reside in the construction and arrangement of parts hereinafter described and particularly pointed out in the appended claims.

Figure 3:
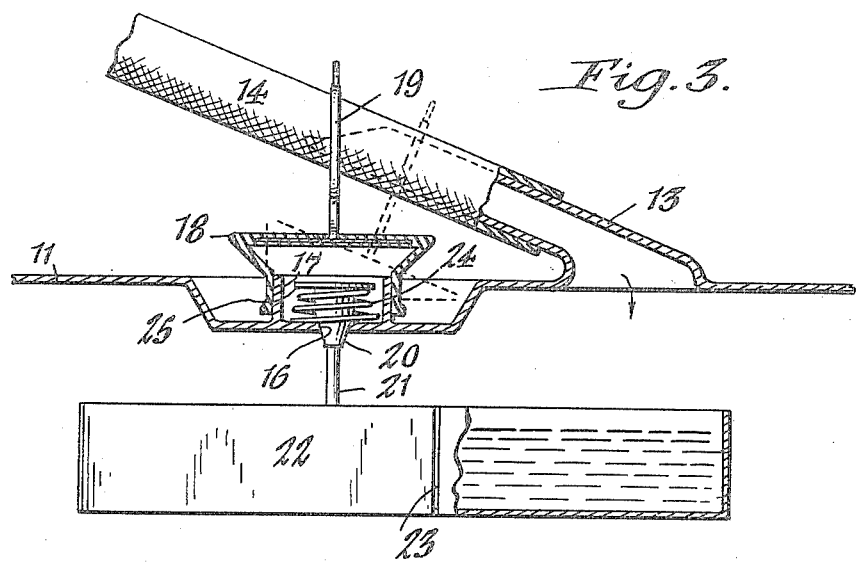
Figure 4:
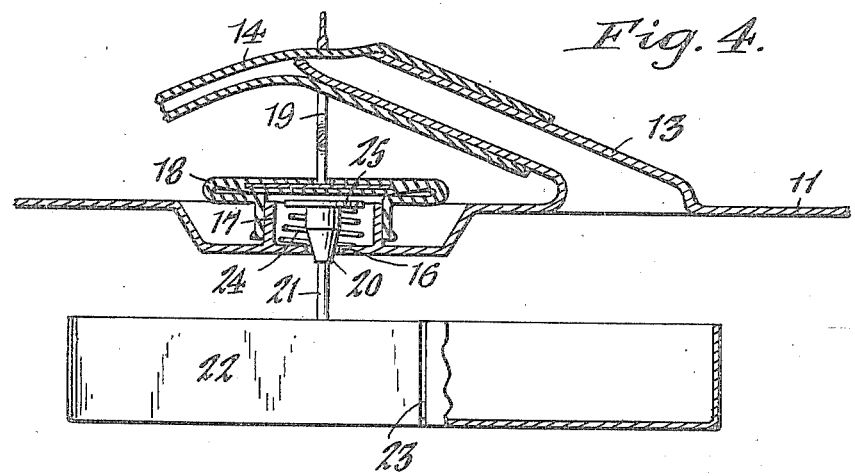
Figure 5:
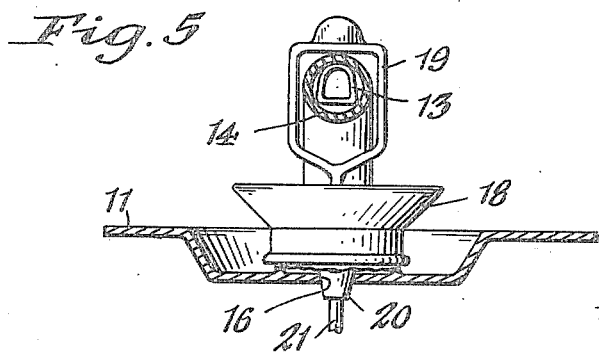

In the accompanying drawings:

Figure 1 is a side view of the milk-receiving can and associated parts of a milking machine showing my invention in connection therewith. Figure 2 is an enlarged top plan view, partly in section, of the can-cover and associated parts embodying my invention. Figure 3 is an enlarged fragmentary cross section taken on line 3—3, Figure 2, with certain parts in elevation and showing the position of the parts in normal milking condition. Figure 4 is a similar view showing the parts in their teat-releasing position. Figure 5 is a cross section taken in the plane of line 5—5, Figure 2.

Similar characters of reference indicate corresponding parts throughout the several views.

By way of example, I have shown my milk control device or controlled quarter milker applied to a milking machine of ordinary construction, 10 indicating the milk-receiving can having an operating top or cover 11 detachably applied thereto and adapted to be held firmly and tightly in place by the vacuum employed in the milking operation. A handle or bail 12 is provided for facilitating its handling as well as suspending it from the cow during the milking operation. Radiating from the top of the cover are milk intake tubes 13 which are individually connected by companion flexible conduits or hose connections 14 having teat cups 15 at their free ends for detachable connection to the cow's teats. It will be noted that the mouth edges of these tubes are substantially oblique to the tube-axes so that when a teat cup is disconnected from the cow its flexible conduit will bend over the edge of the tube and thereby close off its mouth so as not to disturb the vacuum in the system. My improved device is operatively associated with each teat connection, of which there are usually four, and as each quarter of the cow's bag is milked out, its companion teat cup will be automatically released from the cow with the flexible connection or conduit being closed or sealed across the mouth of the cover-tube.

Associated with each intake tube 13 is my milk-flow control unit which acts individually and independently of the others, at such time as the companion quarter of the cow's bag is milked out or its flow reduced to a predetermined minimum, to exert a pressure on the corresponding flexible conduit to close it over the mouth of the tube to shut off the vacuum to such quarter and accordingly automatically release the cup from the cow's teat. To this end the cover 11 is provided below each tube 13 with a vent port 16 about which extends a neck 17, and to which neck a diaphragm-like member 18 of rubber or like flexible material is detachably connected.

This diaphragm-like member, which may be shaped as shown in Figures 3 and 4, is adapted to collapse or be drawn downward when the port is in open vacuum communication with the can 10. Rising from the top face of this diaphragm-like member is a bail or yoke 19 which is adapted to engage about the flexible conduit 14 in the plane of the oblique mouth of the companion tube 13, so that when the diaphragm is influenced by the vacuum in the machine the bail is drawn downward to firmly draw or pinch the flexible conduit over the tube-mouth, thereby shutting off the vacuum to the companion quarter of the cow's bag with the result that the companion cup 15 is automatically released therefrom.

The vent port 16 is controlled by a valve 20 extending within the space defined by the neck 17 and applied to the upper end of a stem 21 extending through such port and to whose lower end is attached a milk-receiving receptacle 22 which may be shaped in plan as shown in Figure 2 so as to be in register with and receive the milk flowing from the companion intake tube 13. A drain opening 23 is formed in this receptacle so that the milk therein is free to drain therefrom at a predetermined rate of flow into the can during the milking operation. A spring 24 applied to this valve and bearing at one end against a head 25 thereon and at its other end against the portion of the cover within the neck 17 serves to normally urge the receptacle to an elevated position and the valve to a corresponding open position relative to the port 16.

At the start of the milking operation and before the machine is turned on, the bail 19 is shifted laterally to the position shown by dotted lines in Figure 3 where it embraces the flexible conduit about the tube 13, the diaphragm-like member 18 being flexible to be displaced therewith, for the purpose of preventing collapse of such member and accordingly the resulting closing off of the companion tube. As soon as sufficient milk has been intercepted by the receptacle 22 to lower it and close the valve 20, then the bail 19 can be shifted to a position in readiness to operate, as shown by full lines in Figure 3.

As the flow of milk drawn from a given quarter of the cow's bag is reduced below that of the rate of flow of milk from the receptacle 22, the latter, being gradually drained of its milk, is caused to be elevated by the spring 24 and the valve 20 is accordingly opened to subject the diaphragm 18 to the vacuum in the machine. Thereupon the diaphragm is smartly collapsed, drawing the bail 19 with it to effectually close the companion conduit 14 across the oblique mouth of the tube 13. By this operation the vacuum is shut off from the quarter of the cow's bag in question and the teat cup 15 companion thereto is automatically released and drops by gravity alongside the can 10. Similarly, as each quarter of the cow's bag is milked out, and the time required for so doing may vary in each instance, the companion teat connection is automatically shut off and its teat cup released, thereby effectually preventing injury to the cow due to keeping the machine in operation too long.

I claim as my invention:

1. The combination with a milking machine having milk-conveying conduits including teat cups thereon for connection to the cow's teats, of receptacles adapted for suspension in the milk-receiving can and each in individual communication with the flow of milk from a companion teat cup and from which receptacles the milk is discharged at a predetermined rate, individual vacuum-governed means operatively connected to said conduits for cutting off the vacuum and the flow of milk therethrough, and valve means in operative association with the companion vacuum-governed means and the receptacles for rendering the former operative when the flow of milk through a companion conduit is reduced below normal.

2. The combination with a milking machine having flexible teat connections for conducting the milk from the cow to a milk-receiving can, of individual means disposed in operative relation with said teat connections and out of contacting relation with the flow of milk therethrough for shutting off the flow of milk therethrough from the companion quarters of the cow's bag, and milk flow-controlled devices operatively connected to said individual means for rendering the same respectively operative when the flow of milk extracted through the companion teat connections is reduced below the normal rate of flow, each of said individual means including a bail-like member for exerting a pinching pressure on its companion flexible connection to close the same.

3. The combination with a milking machine having teat connections for conducting the milk by vacuum from the cow to a milk-receiving can, of vacuum-operated means disposed in correlation with each of said teat connections for shutting off the vacuum and the flow of milk therethrough from the companion quarter of the cow's bag, and ported milk-receiving receptacles suspended in the can in communicating relation with the discharge ends of the companion teat connections and having means thereon in operative governing relation to said vacuum operated means for controlling the same.

4. In a milking machine, individual means disposed in operative relation with the teat connections thereof and operative by the vacuum employed in the milking operation for shutting off the vacuum and the flow of milk therethrough from the companion quarters of a cow's bag, and milk-flow governed valve means for controlling said individual means to shut off such vacuum and the flow of milk through one or another of the teat connections when the flow of milk therethrough is reduced below normal.

5. In a milking machine, individual means disposed in operative relation with the teat connections thereof and operative by the vacuum employed in the milking operation for shutting off the vacuum and the flow of milk therethrough from the companion quarters of a cow's bag, and milk-flow governed valve means for controlling said individual means to shut off such vacuum and the flow of milk through one or another of the teat connections when the flow of milk therethrough is reduced below normal, each of said valve means including a ported milk-receiving receptacle adapted to be disposed in the path of flow of the milk from a companion teat connection, a stem rising from said receptacle and having a valve at its upper end in governing relation to the companion individual teat connection shut off means and movable to and from an open or closed position to render such means operative or inoperative, and a spring for urging said valve to an open position.

6. The combination with a milking machine having milk-conveying conduits including teat cups thereon for connection to the cow's teats, of milk-flow controlled, vacuum responsive means interposed between the machine and the cups for individually breaking the vacuum to such cups when the flow of milk during the milking operation is below predetermined quantity for automatically causing the release of the cups from the cow's teats, each of said means including a diaphragm having a conduit-engaging member whereby upon the collapse of the diaphragm said member is caused to close-off the companion conduit.

7. In a milking machine, a can-engaging cover having a teat connection leading therefrom and a vent port, a diaphragm in influencing relation to said port and operative by the vacuum employed in the milking operation to a collapsed position, means applied to said diaphragm and in operative engagement with the teat connection to shut off the flow of milk therethrough upon the collapse of the diaphragm, and milk-flow governed valve means for controlling said port.

8. In a milking machine, a can-engaging cover having a teat connection leading therefrom and a vent port, a neck rising from the cover about said port, a diaphragm-like member detachably mounted on said neck and operative to a collapsed position by the vacuum employed in the milking operation, a part rising from said member for engagement with the teat connection and operative upon the collapse of the diaphragm-like member to shut off the vacuum to and the flow of milk through said connection, and milk-flow governed valve means for controlling said port.

9. In a milking machine, a can-engaging cover having a teat connection leading therefrom and a vent port, a neck rising from the cover about said port, a diaphragm-like member detachably mounted on said neck and operative to a collapsed position by the vacuum employed in the milking operation, a part rising from said member for engagement with the teat connection and operative upon the collapse of the diaphragm-like member to shut off the vacuum to and the flow of milk through said connection, and milk-flow governed valve means for controlling said port, said means including a yieldingly suspended receptacle having a drain opening therein and disposed in the path of flow of the milk from the teat connection, and a valve member on said receptacle and in controlling relation with said vent port.

10. The combination with a milking machine having flexible teat connections for conducting the milk by vacuum from the cow to a milk-receiving can, and vacuum-governed devices applied to the can in individual operative relation to said connections for automatically and selectively exerting a contacting pressure thereon to shut off the vacuum and flow of milk therethrough from the companion quarters of the cow's bag when the flow of milk through a companion teat connection is reduced below a predetermined quantity.

11. The combination with a milking machine having flexible teat connections for conducting the milk by vacuum from the cow to a milk-receiving can, and combined milk flow and vacuum governed means in individual operative relation to said connections for automatically exerting a contacting pressure thereon to shut off the vacuum and flow of milk therethrough from the companion quarters of the cow's bag as such quarters are substantially milked out.

12. The combination with a milking machine having flexible teat connections for conducting the milk by vacuum from the cow to a milk-receiving can, bail-like members applied to the can in individual operative relation to said connections and adapted for actuation to pinch the latter for shutting off the vacuum and flow of milk therethrough from the companion quarters of the cow's bag, and individual milk flow controlled, vacuum-actuated means companion to and operatively connected to said members for rendering them operative to their pinched shut-off positions when the flow of milk through a companion teat connection is reduced below a predetermined quantity.

13. The combination with a milking machine having milk-conveying conduits including teat cups thereon for connection to the cow's teats, of receptacles adapted for suspension in the milk-receiving can and each in individual communication with the flow of milk from a companion teat cup and from which receptacles the milk is discharged at a given rate, vacuum-responsive means engageable with the companion conduits for shutting off the vacuum and the flow of milk through one or another of the conduits when the milk flow during the milking operation is below a predetermined quantity, and milk-flow governed valve means operatively connected to the companion receptacles for controlling said vacuum responsive means to cause the shutting off of the flow of milk through the companion conduits under the aforesaid milk-flow conditions.

14. The combination with a milking machine having milk-conveying conduits including teat cups thereon for connection to the cow's teats, of receptacles adapted for suspension in the milk-receiving can and each in individual communication with the flow of milk from a companion teat cup and from which receptacles the milk is discharged at a given rate, individual vacuum-actuated means operatively connected to said conduits for cutting off the vacuum and the flow of milk therethrough, and means in operative governed relation with said companion receptacles and said individual means for rendering the latter operative when the flow of milk through a companion conduit is reduced below a predetermined quantity.

15. In a milking machine, a can-engaging member having a teat connection leading therefrom and a vent port, a milk-flow governed valve means for controlling said port, said valve means being rendered operative to open said port under predetermined milk flow conditions, and means in controlling relation to said port for operation by the vacuum employed in the milking operation and having a part in governing relation with the teat connection to shut off the vacuum and the flow of milk therethrough when said valve means is rendered operative.

16. The combination with a milking machine having flexible milk-conveying conduits including teat cups thereon for connection to the cow's teats, of displaceable means in embracing-like relation to each of said conduits for exerting a pinching pressure thereon to contract and close the same to cut off the vacuum to the cups and to cause the release of the latter from the companion quarter of the cow's bag as the flow of milk therefrom during the milking operation is reduced below a predetermined quantity, and milk-flow governed means companion to and for operatively controlling the contraction of said displaceable means.

17. The combination with a milking machine having flexible teat connections for conducting the milk by vacuum from the cow to a milk-receiving can, of vacuum operated displaceable means disposed in individual embracing-like correlation with each of said teat connections for exerting a contracting pressure thereon to close the same for shutting off the vacuum and the flow of milk therethrough from the companion quarter of the cow's bag, and means governed by the flow of milk through said connections and operatively connected to said displaceable means for rendering the latter operative to contract and close the connections when the flow of milk is reduced below a predetermined quantity.

18. The combination with a milking machine having flexible teat connections for conducting the milk by vacuum from the cow to a milk-receiving can, of combined milk-flow controlled and vacuum responsive displaceable means in individual embracing-like relation with said teat connections for exerting a contracting pressure thereon to close the same for shutting off the vacuum thereto and releasing the same from the companion quarter of the cow's bag when the flow of milk therethrough is reduced below a predetermined quantity.

19. The combination with a milking machine having teat connections for conducting the milk by vacuum from the cow to a milk-receiving can, of vacuum operated means applied to the can in correlation with and out of contacting relation with the flow of milk therethrough for individually and automatically cutting off the flow of milk from the companion quarters of the cow's bag when such flow reaches a predetermined minimum during the milking operation, and milk-flow governed means in the can and companion to the teat connections and said vacuum operated means for controlling the operation of the latter.

20. The combination with a milking machine having flexible milk-conveying conduits including teat cups thereon for connection to the cow's teats, of vacuum-operated means in operative relation to each of said conduits for contracting the same to cut off the vacuum to the cups and to cause the release of the latter from the companion quarter of the cow's bag, and milk-flow governed means in communicating relation with the discharge ends of said conduits and in operative governing relation to said vacuum-operated means for rendering the latter operative to cut off the vacuum to the cups when the flow of milk from the companion quarters of the cow's bag is reduced below normal.

21. In a machine of the character described, a can-engaging cover having a fluid-conducting tube projecting therefrom for receiving a flexible conduit and having the mouth-edge thereof disposed obliquely to the tube-axis, a vacuum-operated diaphragm applied to said cover, and a bail mounted on said diaphragm and engageable with the conduit in the plane of the oblique edge of said tube and adapted when the diaphragm is collapsed to compress the conduit across the tube-mouth to close the same.

22. The combination with a milking machine having teat cup connections including flexible conduit portions for conducting the milk by vacuum from the cow, of vacuum-governed displaceable means in individual embracing-like relation to the flexible portions of said teat connections for automatically and selectively exerting a transverse contracting pressure thereon to shut off the vacuum to companion quarters of the cow's bag when the flow of milk through companion teat connections substantially ceases.

23. The combination with a milking machine having teat cup connections including flexible conduit portions for conducting the milk by vacuum from the cow, means in individual embracing-like relation to the flexible portions of said teat connections and adapted for displacement from a normal position to a position to contract such portions to shut off the vacuum to companion quarters of the cow's bag, and vacuum-governed means in operative relation to said individual means for rendering them selectively displaceable to their contracted shut off positions when the flow of milk through the companion connections substantially ceases.

ALBERT G. PERKINS.

REFERENCES CITED

The following references are of record in the file of this patent:

UNITED STATES PATENTS

| Number | Name | Date |
|---|---|---|
| 474,830 | Hoover et al. | May 17, 1892 |
| 839,202 | Rickard | Dec. 25, 1906 |
| 908,449 | Daniels | Jan. 5, 1909 |
| 938,857 | Henrichsen et al. | Nov. 2, 1909 |
| 998,856 | Mitchell | July 25, 1911 |
| 1,109,800 | Sorenson | Sept. 8, 1914 |
| 1,385,049 | Holmes | July 19, 1921 |
| 1,387,983 | Hofmeister | Aug. 16, 1921 |
| 2,099,884 | Green | Nov. 23, 1937 |
| 2,321,616 | Perkins | June 15, 1943 |
| 2,396,544 | Voyle et al. | Mar. 12, 1946 |

FOREIGN PATENTS

| Number | Country | Date |
|---|---|---|
| 7,710 | Denmark | July 24, 1905 |
| 284,367 | Germany | May 22, 1915 |
| 621,883 | France | Feb. 14, 1927 |
| 377,111 | Great Britain | July 21, 1932 |